United States Patent
Postle

(10) Patent No.: US 9,724,786 B2
(45) Date of Patent: Aug. 8, 2017

(54) METAL CORED WELDING WIRE, HARDBAND ALLOY AND METHOD

(71) Applicant: Postle Industries, Inc., Cleveland, OH (US)

(72) Inventor: Christopher J. Postle, North Royalton, OH (US)

(73) Assignee: Postle Industries, Inc., Cleveland, OH (US)

( * ) Notice: Subject to any disclaimer, the term of this patent is extended or adjusted under 35 U.S.C. 154(b) by 491 days.

(21) Appl. No.: 14/077,722

(22) Filed: Nov. 12, 2013

(65) Prior Publication Data

US 2014/0131338 A1    May 15, 2014

Related U.S. Application Data

(60) Provisional application No. 61/726,205, filed on Nov. 14, 2012.

(51) Int. Cl.
*C22C 38/40* (2006.01)
*C22C 38/58* (2006.01)
(Continued)

(52) U.S. Cl.
CPC ........... *B23K 35/3086* (2013.01); *B23K 9/04* (2013.01); *B23K 9/048* (2013.01);
(Continued)

(58) Field of Classification Search
CPC .................. B23K 35/0266; B23K 35/0272
(Continued)

(56) References Cited

U.S. PATENT DOCUMENTS

| 2002/0148533 A1* | 10/2002 | Kim ................... B23K 35/368 148/24 |
| 2006/0165552 A1* | 7/2006 | Kapoor ............ B23K 35/0261 420/70 |
| 2009/0261085 A1* | 10/2009 | Suzuki .................. B23K 9/173 219/137 PS |
| 2012/0196149 A1 | 8/2012 | Fifield |

OTHER PUBLICATIONS

Marketing Brochure; Hardbanding Solutions by Postle Industries, Non-Cracking NS-1TM Approved Casing Friendly 100% Rebuildable: Postle Industries, Inc.; http://www.hardbandingsolutions.com/postle/pdfs/hardbanding_brochure_2011_eng_email.pdf; 2011 (pp. 1-12).

(Continued)

*Primary Examiner* — Tu B Hoang
*Assistant Examiner* — Thomas Ward
(74) *Attorney, Agent, or Firm* — Tarolli, Sundheim, Covell & Tummino LLP; Eileen T. Mathews, Esq.

(57) ABSTRACT

Various embodiments of a metal cored wires, hardband alloys, and methods are disclosed. In one embodiment of the present invention, a hardbanding wire comprises from about from about 16% to about 30% by weight chromium; from about 4% to about 10% by weight nickel; from about 0.05% to about 0.8% by weight nitrogen; from about 1% to about 4% by weight manganese; from about 1% to about 4% by weight carbon from about 0.5% to about 5% by weight molybdenum; from about 0.25% to about 2% by weight silicon; and the remainder is iron including trace elements. The hardband alloy produced by the metal cored wire meets API magnetic permeability specifications and has improved metal to metal, adhesive wear resistance compared to conventional hardband alloys.

16 Claims, 1 Drawing Sheet

(51) Int. Cl.
    *B23K 35/30*       (2006.01)
    *B23K 9/04*        (2006.01)
    *B23K 35/02*       (2006.01)
    *C22C 37/08*       (2006.01)
    *C22C 38/18*       (2006.01)
    *C22C 38/36*       (2006.01)
    *B23K 101/38*     (2006.01)

(52) U.S. Cl.
    CPC ...... *B23K 35/0244* (2013.01); *B23K 35/0261* (2013.01); *B23K 35/0266* (2013.01); *B23K 35/308* (2013.01); *B23K 35/3053* (2013.01); *C22C 37/08* (2013.01); *C22C 38/18* (2013.01); *C22C 38/36* (2013.01); *C22C 38/40* (2013.01); *C22C 38/58* (2013.01); *B23K 2201/38* (2013.01)

(58) Field of Classification Search
    USPC ................ 219/56, 74, 145.1–146.52; 148/23
    See application file for complete search history.

(56) References Cited

OTHER PUBLICATIONS

Marketing Brochure, Postle Industries Hardbanding Laboratory; Postle Industries, Inc.; http://www.hardbandingsolutions.com/postle/pdfs/new_laboratory_document.pdf; More than one year before Nov. 12, 2013; (pp. 1-4).
Joe Haberer, "Viable Drill Pipe Hardbanding Strategies are Outlined", Drilling Contractor; Nov./Dec. 2000, pp. 48-49.
Marketing Brochure: Postalloy Welding Products, Hard Surfacing Build-Up Tool Steel Repair; Postle Industries Inc.; More than one year before Nov. 12, 2013, (pp. 1-20).
Marketing Brochure, Efield Electromagnetic MWD, Scientific Drilling; More than one year before Nov. 12, 2013, (1 pg.).
Marketing Brochure, Efield Electromagnetic MWD; Scientific Drilling, http://www.scientificdrilling.com/images/uploads/documents/E-Field_MWD_Product_Sheet-2012-07.pdf; Jul. 2012, (1 pg.).

* cited by examiner

METAL CORED WELDING WIRE, HARDBAND ALLOY AND METHOD

RELATED APPLICATION

This patent application claims priority to application Ser. No. 61/726,205 entitled "Metal Cored Welding Wire, Hardband Alloy and Method" filed on Nov. 14, 2012 and which is incorporated by reference herein.

FIELD OF THE INVENTION

The present invention relates generally to hardband welding wires, hardband alloys formed on base metal of equipment, and methods for applying the hardbanding wire. More specifically, the present invention relates to welding wires, hardband alloys and methods for applying hardbanding wire in the oil and gas industry.

BACKGROUND

Hardbanding is a process that is used in the oil and gas industry to apply metal welding wire onto the surface of industrial parts or components used in drilling. In such as process an elongated metal wire is welded to a metal base material to bad, reinforce, or repair the part to extend the utility of the part that is subjected to high fictional forces and abrasive forces. In specific applications of the oil and gas industry various hardband alloys produced from the metal wires protect directional drilling equipment such as magnetic drill collars, stabilizers. Measurement While Drilling (MWD) tools, Logging While Drilling (LWD) tools, and related components. In "directional drilling" the sensitive electronic devices used to navigate drilling equipment or otherwise gather information, are protected by a drill collar. The drill collar has a low magnetic permeability to prevent interference with data transfer that is either received by or transmitted to the electronic equipment. The specification of magnetic permeability for the drill collars for directional drilling is set forth by the American Petroleum Institute, API. For example, the API Specification 7 requires a relative magnetic permeability less than 1.01 for drill collars used in directional drilling applications.

Drill collars and equipment used for oil and gas directional drilling are generally made of non-magnetic stainless steel. The conventional welding alloy formed onto the surface of the drill collars or other equipment is typically 310 stainless steel formed by a 310 stainless steel welding wire. The physical properties of 310 stainless steel are such that the hardband alloy is very son and prone to significant wear from abrasion and the components of drilling equipment, for example a drill collar, requires frequent rebuilding. The current welding wires used for hardbanding non-magnetic drill collars and other directional drilling equipment result in less than optimal service life of the equipment and reduced productivity of the drilling process.

SUMMARY

The metal core wires and the hardband alloys formed on the surface of industrial equipment used in drilling oil and gas wells have improved abrasion resistance while also meeting stringent magnetic permeability requirements.

In one embodiment, a metal cored wire comprises, by weight, based on the total weight of the metal cored wire, from about 16% to about 30% chromium; from about 4% to about 10% nickel; from about 0.05% to about 0.8% nitrogen; from about 1% to about 4% carbon; from about 1% to about 4% manganese; from about 0.25% to about 2% silicon; and the remainder is iron including trace elements. In another embodiment the metal cored wire additionally includes from about 0.5% to about 5% by weight molybdenum.

In another embodiment a hardband alloy disposed on an industrial product such as for example a magnetic drill collar, a stabilizer, and a weld drilling tool, comprises, by weight, from about 15% to about 30% chromium; from about 4% to about 10% nickel; from about 0.05% to about 0.8% nitrogen; from about 1% to about 4% carbon; from about 1% to about 4% manganese; from about 0.25% to about 2% silicon; and the remainder is iron including trace elements.

In yet another embodiment, a method for hardbanding an industrial product comprises welding the metal wire to an industrial product to form a hardband alloy on the surface of the industrial product. The metal wire comprises, by weight, based on the total weight of the wire, from about 16% to about 30% chromium; from about 4% to about 10% nickel; from about 0.05% to about 0.8% nitrogen; from about 1% to about 4% manganese; from about 1% to about 4% carbon; from about 0.25% to about 2% by weight silicon; and the remainder is iron including trace elements iron including trace elements.

BRIEF DESCRIPTION OF THE DRAWING

The various embodiments of the present invention can be understood with reference to the following drawings. The components in the drawings are not necessarily to scale. Also, in the drawings, like reference numerals designate corresponding parts throughout the several views.

DETAILED DESCRIPTION

Various embodiments of welding wires, hardband alloys, and methods are disclosed herein. Particular embodiments of the invention will be described below in relation to its applications in the oil and gas drilling industry; however, it will be appreciated that the present invention could be employed across a variety of industrial applications where abrasion resistance is needed.

Figure 1:
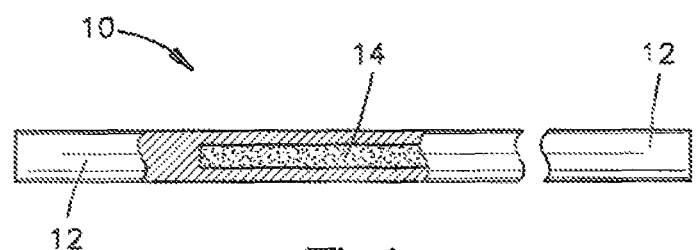
FIG. 1 is a schematic illustration of the longitudinal section of a meta cored welding wire, according to an embodiment of the invention.

FIG. 1 is a schematic illustration of a longitudinal section of a metal cored welding wire, according to an embodiment of the present invention. Metal cored wire 10 includes a metal sheath 12 and powder metal core 14. The cut-away view of sheath 12 shows powder metal core 14 inside the sheath, for example, metal powder particles that reside inside the central portion of the metal cored wire 10. The metal sheath 12 has a cylindrical annular geometry, although alternative geometries are possible.

The metal cored welding wire has an overall metal composition comprising, by weight, based on the total weight of the metal cored wire: from about 16% to about 30%, in another embodiment from about 17% to about 24%, and in another embodiment from about 21% to about 21% chromium; from about 4% to about 10%, in another embodiment from about 4% to about 8%, and in another embodiment from about 5% to about 7% nickel; from about 0.05% to about 0.8%, from about 0.1% to about 0.6%, and in another embodiment from about 0.2% to about 0.4% nitrogen; from about 1% to about 4%, in another embodiment from about 2% to about 4%, and in another embodiment from about 2.5% to about 3.5% manganese; from about 0.6% to about 4%, in another embodiment from about 1% to about 3%, and in another embodiment from about 1.5% to about 2.5% carbon; from about 0.25% to about 2% by weight silicon; and the remainder is iron including trace elements. The remainder amount can include from about 40% to about 78%, in another embodiment from about 45% to about 60%, and in another embodiment from about 45% to about 55% by weight iron, based on the total weight of the metal cored wire.

In another embodiment, the metal cored wire optionally includes, by weight, based on the total weight of the metal cored wire, from about 0.5% to about 5%, in another embodiment from about 1% to about 4%, and in another embodiment about 2% molybdenum.

The weight of the sheath and the metal-powder core, based on the total weight of the metal cored wire, can vary. In one embodiment the weight of the metal sheath ranges from about 60% to about 80% of the total weight of the metal cored wire, and the weight of the metal-powder core ranges from about 20% to about 40% of the total weight of the metal cored wire.

The composition of elements of the metal sheath can vary. The metal cored welding wire in any of the compositional embodiments described above includes a sheath that comprises the following elements, by weight, based on the total weight of the metal sheath, from about 16% to about 22%. In another embodiment from about 16% to about 20%, and in another embodiment from about 17% to about 19% chromium; from about 7% to about 12%, in another embodiment from about 7% to about 10%, and in another embodiment from about 7% to about 9% nickel; from about 0.1% to about 1%, in another embodiment from about 0.2% to about 0.8%, and in another embodiment from about 0.3% to about 0.7% manganese; from about 0.01% to about 0.12%, in another embodiment from about 0.02% to about 0.08%, and in another embodiment from about 0.03% to about 0.06% carbon; from about 0.1% to about 1%, in another embodiment from about 0.2% to about 0.8%, and in another embodiment from about 0.3% to about 0.7% silicon; and the balance iron including trace elements, for example, from about 60% to about 75% by weight iron and trace elements. Suitable materials that may be used to form the sheath include, but are not limited to, 300 Series and 400 Series stainless steel, for example, 302L stainless steel, 304 stainless steel, and 420 stainless steel and 430 stainless steel.

The composition of the metal-powder core can also vary. In alternative embodiments of the present invention, the metal cored welding wire in any of the compositional wire and sheath embodiments described above includes a metal-powder core which comprises the following elements, by weight, based on the weight of the metal-powder core, from about 30% to about 50%, in another embodiment from about 30% to about 40%, and in another embodiment from about 32% to about 38% chromium; from about 1% to about 5%, in another embodiment from about 2% to about 4%, and in another embodiment from about 2.5% to about 1.5% nickel; from about 0.1% to about 1%, in another embodiment from about 0.15% to about 0.8%, and in another embodiment from about 0.2% to about 0.6% nitrogen; from about 1% to about 8%, in another embodiment from about 2% to about 6%, and in another embodiment from about 2% to about 5% manganese; from about 2% to about 7%, in another embodiment from about 2% to about 6%, and in another embodiment from about 4% to about 6% carbon; from about 0.25% to about 4%, in another embodiment from about 0.5% to about 3%, and in another embodiment from about 0.5% to about 2% silicon; and the balance is iron including trace elements, for example, from about 40% to about 60% by weight iron and trace elements. In another embodiment the metal-powder core of can further include, by weight, based on the metal-powder core, from about 0.5% to about 5%, in another embodiment from about % to about %, and in another embodiment from about % to about % by weight molybdenum.

The metal core welding wires are used to form, via welding, hardband alloys onto the surface of industrial equipment used in drilling for oil and gas. The diameter of the wire can vary and common wire diameter used for welding to form hardband alloys include, but are not limited to, 1/16 inch, 3/32, 7/64, and 1/8 inch, etc. The wall thicknesses of the sheath of the wire typically range from about 0.010 inch to about 0.020 inch, or as another example, from about 0.011 to about 0.017 inch, and can vary depending upon the diameter of the sheath.

Industrial equipment used in earth boring equipment is prone to experience a high degree of surface wear due to the particularly abrasive environments in which they are used. As such, the service life and the performance of the components can be significantly reduced. The various embodiments of the metal cored welding wire described herein may be applied to new parts or products to increase the wear resistance of the part, or applied to older parts or products in order to restore a worn surface of the part and to extend the working life of the part or product. The hardband alloy formed onto a metal surface, for example the surface of a oil and gas drilling equipment, has a weight loss of less than about 1 gram, and in another example less than about 0.05 gram, and in another example about 0.4 gram or less, according to ASTM G65 Wear Testing.

Figure 2:
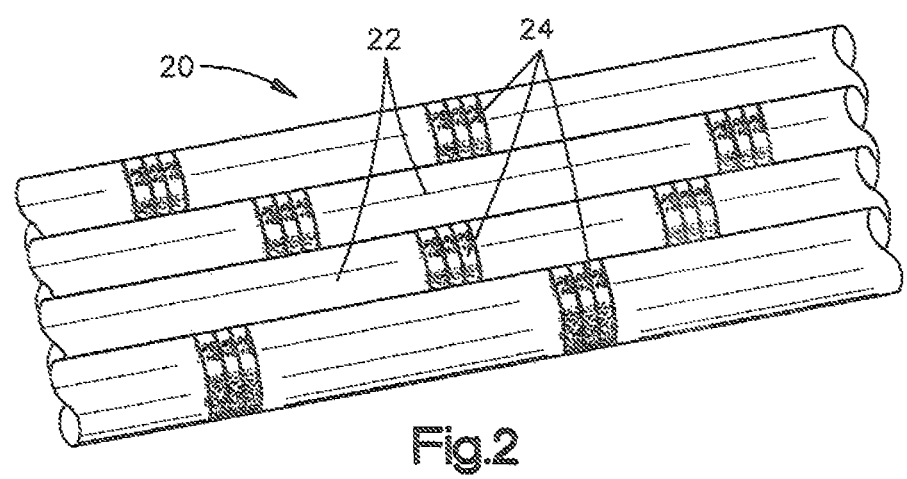
FIG. 2 is a schematic illustration of a plurality of drill collars having as hardband alloy formed thereon, according to an embodiment of the present invention.

The hardband alloys produced from the metal wires protect directional drilling equipment such as magnetic drill collars, stabilizers, Measurement While drilling (MWD) tools, Logging While Drilling (LWD) tools, and related components. FIG. 2 is a schematic illustration of a plurality of non-magnetic drill collars, 20 having hardband alloys 22 formed thereon, according to an embodiment of the present invention. The hardband alloys 22 are formed by welding metal cored wires onto the drill collar as disclosed herein.

Figure 3:
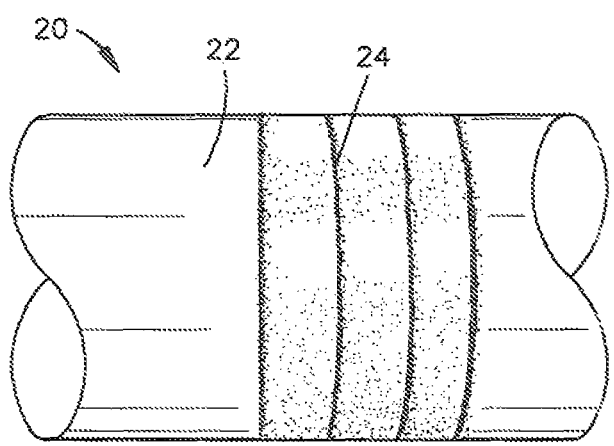
FIG. 3 is a closer view of a section of a drill collar of FIG. 2 having a hardband alloy formed thereon, according to an embodiment of the present invention.

In "directional drilling" the sensitive electronic devices used to navigate drilling equipment or otherwise gather information, are protected by a drill collar. FIG. 3 is a closer view of a section of drill collar 20 showing non-magnetic drill collar with a hardband alloy 24 formed thereon using metal cored wire. The drill collar has a low magnetic permeability to prevent interference with data transfer that is either received by or transmitted to the electronic equipment. Non-magnetic base materials used for drill collars and other oil and gas equipment and components include, but are not limited to, P530, AG17, 15-15LC, NMS-100 and others. The specification of magnetic permeability for the collars for directional drilling is set forth by the American Petroleum Institute, API. For example, the API Specification 7 requires a relative magnetic permeability less than 1.01 for drill collars used in directional drilling applications.

Accordingly, in another embodiment a hardband alloy is disposed on an industrial product such as for example a magnetic drill collar, a stabilizer, and a well drilling tool, comprises, by weight, from about 16% to about 30% chromium; from about 4% to about 10% nickel; from about 0.05% to about 0.8% nitrogen; from about 1% to about 4% carbon; from about 1% to about 4% manganese; from about 0.25% to about 2% silicon; and the balance iron including trace elements.

The metal core wires and hardband alloys formed on the surface of industrial equipment used in directional drilling oil and gas have improved abrasion resistance while also meeting stringent magnetic permeability requirements for tools used to protect sensitive electronic devices used in conjunction with the equipment. The hardband alloy prolongs the life of an industrial product subject to abrasion during use.

Accordingly, a method for hardbanding an industrial product comprises welding the metal cored wire to and industrial product. The metal cored welding wire comprises, by weight, based on the total weight of the wire, from about 16% to about 30% by weight chromium; from about 4% to about 10% by weight nickel; from about 0.05% to about 0.8% by weight nitrogen; from about 1% to about 4% by weight manganese; from about 1% to about 4% by weight carbon from about 0.5% to about 5% by weight molybdenum; from about 0.25% to about 2% by weight silicon; and from about 40% to about 77% by weight iron including trace elements.

The outer surface area of the equipment or component, whether new or previously used, can be inspected prior to welding and may be cleaned of debris, rust, paint, lubricants, and other foreign matter, and the surface may be preheated prior to the application of the weld wire. The wire may be welded to the surface of the tool using arc welding. Examples of possible welding processes include, but are not limited to, flux core arc welding (FCAW), as metal arc welding (GMAW), and plasma arc welding (PAW). After welding, the weld, deposit and tool are cooled at a gradual rate depending upon the application and environment for welding. Typically, the weld beads of the hardband alloy are up to about 25 mm wide and up to about 3 mm thick and can be deposited in single or double layers without spoiling.

It will be appreciated that the hardband alloys produced by the metal cored wire in accordance with the embodiments of the present invention have a microstructure and composition that enhances service life of and performance of components across a wide variety of industries, including the oil and gas drilling industry. Such an improvement in abrasive wear resistance is demonstrated in a significant reduction in weight loss according to ASTM G65 Wear Testing. The hardband alloy produced by the metal cored wires herein offer improved metal to metal adhesive wear resistance. The hardband alloys produced are crack-free, are abrasion resistant to siliceous earth particles, and meet API magnetic permeability specifications of less than 1.01.

EXAMPLES

In older to more fully and clearly describe the present invention so that those skilled in the art may better understand how to practice the present invention, the following examples are given. The examples are intended to illustrate the invention and should not be construed as limiting the invention disclosed and claimed herein in any manner.

The elemental compositions of the welding wires are listed below in Table 1, Control 1 sample tested was made of a 310 stainless steel solid wire with the specified composition. Control 2 and Control 3 samples were metal cored wires which had carbon steel sheath with the overall composition listed in Table 1. Control 2 sample was Stoody 133 wire and Control 3 sample was Stoody 110-G wire, both available from Stoody Corp., of Bowling Green, Ky.

Example 1, a metal cored wire composition according to an embodiment of the present invention, was tested and compared to the control samples. Table 1 lists the amounts of each element as a weight percentage of the total weight of the metal cored wire, and the amount of each element present in the sheath as a weight percentage of the total weight of the sheath, and the amount of each element present in the powder-metal core as a weight percentage of the total weight of the powder-metal core.

TABLE 1

| Elemental Compositions, Weight Percent | | | | | | | | | | |
|---|---|---|---|---|---|---|---|---|---|---|
| Samples | Cr | Ni | Mo | Mn | C | P | Si | N | Cu | Fe/Others |
| Control 1 | 25-28 | 20-22.5 | 0.75 max | 1-2.5 | .08-.15 | 0.03 max | 0.30-0.65 | — | 0.75 max | Balance |
| Control 2 | 26 | 3 | 0.8 | 1.6 | 1.7 | — | 1.6 | — | — | Balance |
| Control 3 | 17 | 0.7 | — | 15 | 0.3 | — | 0.4 | — | — | Balance |
| Example 1 Wire | 22 | 6 | 2 | 3 | 2 | — | 1 | 0.3 | — | Balance 57.7 |
| Ex. 1 Sheath | 18 | 8 | — | 0.5 | 0.04 | — | 0.5 | — | — | Balance 72.6 |
| Ex. 1 Core | 36 | 3 | 2 | 5 | 5 | — | 1 | 0.3 | — | Balance 47.7 |

All samples were tested for magnetic permeability according to ASTM A342 standard. As indicated in Table 2 below, only the Control 1 sample (310 stainless steel wire) and Example 1 sample according to an embodiment of the present invention had a relative magnetic permeability below the threshold standard of less than 1.01 required by the API. Control 1 and Example 1 samples were further tested for abrasion resistance according to ASTM G-65 Dry and Procedure. Each test piece was placed in a holder and loaded with a force against a rotating rubber wheel. At the end of a predetermined number of rotations, the sample was examined for weight loss.

TABLE 2

| Performance Properties | | |
|---|---|---|
| Samples | Magnetic Permeability ASTM A342 | Abrasion (wt. loss) ASTM G65 |
| Control 1 | <1.01 | 2.2 grams |
| Control 2 | >1.01 | N/A |
| Control 3 | >1.01 | N/A |
| Example 1 | <1.01 | 0.4 grams |

The results show that the hardband alloy of Example 1 meets magnetic permeability specifications and offers substantially improved wear resistance compared to conventional nonmagnetic welding alloys, namely the 310 stainless steel. This wear resistance represents an improvement of over 500%.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A metal cored wire for forming a hardband alloy onto a surface, the metal wire comprising:
   a metal sheath;
   a metal-powder core material; and
   wherein the metal cored wire comprises, by weight, based on the total weight of the metal cored wire:
      from about 16% to about 30% by weight chromium;
      from about 4% to about 10% by weight nickel;
      from about 0.05% to about 0.8% by weight nitrogen;
      from about 1% to about 4% by weight manganese;
      from about 0.6% to about 4% by weight carbon;
      from about 0.25% to about 2% by weight silicon; and
      from about 40% to about 78% by weight iron wherein the metal-powder core comprises, by weight, based on the weight of the metal-powder core: from about 30% to about 50% by weight chromium; from about 1% to about 5% by weight nickel; from about 0.1% to about 1% by weight nitrogen; from about 1% to about 8% by weight manganese; from about 2% to about 7% by weight carbon from about 0.25% to about 4% by weight silicon; and from about 40% to about 60% by weight iron; and wherein the metal sheath comprises, by weight, based on the weight of the metal sheath: from about 16% to about 22% by weight chromium; from about 7% to about 12% by weight nickel; from about 0.01% to about 1% by weight manganese; from about 0.04% to about 0.12% by weight carbon from about 0.1% to about 1% by weight silicon; and from about 60% to about 75% by weight iron.

2. The metal cored wire of claim 1, further comprising, by weight, from about 0.5% to about 5% by weight molybdenum.

3. A method of using the metal cored wire of claim 1, wherein the hardband alloy formed onto the surface has a relative magnetic permeability of less than about 1.01 according to the API Standard, and wherein the hardband alloy formed onto the surface has a weight loss of less than 0.5 grams according to ASTM G65 Wear Testing.

4. The metal cored wire of claim 1, wherein the weight of the metal sheath ranges from about 60% to about 80% of the total weight of the metal cored wire, and the weight of the metal-powder core ranges from about 20% to about 40% of the total weight of the metal cored wire.

5. The metal cored wire of claim 1, wherein the metal-powder core comprises, by weight, based on the weight of the metal-powder core:
   from about 30% to about 50% by weight chromium;
   from about 1% to about 5% by weight nickel;
   from about 0.1% to about 1% by weight nitrogen;
   from about 1% to about 8% by weight manganese;
   from about 2% to about 7% by weight carbon
   from about 0.25% to about 4% by weight silicon; and
   from about 40% to about 60% by weight iron.

6. A metal cored wire for forming a hardband alloy onto a surface, the metal cored wire comprising:
   from about 16% to about 30% by weight chromium;
   from about 4% to about 10% by weight nickel;
   from about 0.05% to about 0.8% by weight nitrogen;
   from about 1% to about 4% by weight manganese;
   from about 0.6% to about 4% by weight carbon;
   from about 0.25% to about 2% by weight silicon; and
   from about 40% to about 78% by weight iron
a sheath comprising, by weight, based on the total weight of the sheath:
   from about 16% to about 20% by weight chromium;
   from about 6% to about 10% by weight nickel;
   from about 0.03% to about 0.08% by weight manganese;
   from about 0.03% to about 0.08% by weight carbon
   from about 0.1% to about 0.08% by weight silicon;
   from about 68% to about 77% by weight iron;
a metal-powder core comprising, by weight, based on the total weight of the metal-powder core:
   from about 32% to about 45% by weight chromium;
   from about 2% to about 4% by weight nickel;
   from about 0.1% to about 0.8% by weight nitrogen;
   from about 3% to about 7% by weight manganese;
   from about 2% to about 4% by weight carbon
   from about 1% to about 3% by weight silicon; and
   from about 45% to about 55% by weight iron.

7. A method for hardbanding an industrial product, the method comprising:
   welding a metal cored wire to an industrial product to form a hardband alloy; and
   wherein the metal cored wire comprises:
      a metal sheath;
      a metal-powder core material; and
      the metal cored wire comprises, by weight, based; on the total weight of the metal cored wire:
         from about 16% to about 30% by weight chromium;
         from about 4% to about 10% by weight nickel;
         from about 0.05% to about 0.8% by weight nitrogen;
         from about 1% to about 4% by weight manganese;
         from about 0.6% to about 4% by weight carbon;
         from about 0.25% to about 2% by weight silicon; and
         from about 49% to about 80% by weight iron; and
   wherein the metal-powder core comprises, by weight, based on the weight of the metal-powder core:
      from about 30% to about 50% by weight chromium;
      from about 1% to about 5% by weight nickel;
      from about 0.1% to about 1% by weight nitrogen;
      from about 1% to about 8% by weight manganese;
      from about 2% to about 7% by weight carbon
      from about 0.25% to about 4% by weight silicon;
      from about 40% to about 60% by weight iron.

8. The method of claim 7, wherein:
   the hardband alloy formed on the industrial product is non-magnetic and has a relative magnetic permeability of less than about 1.01 according to the API Standard; and
   the hardband alloy formed on the industrial product has a weight loss of less than 0.5 grams according to the ASTM G65 wear testing.

9. The metal cored wire of claim 1, wherein the metal-powder core comprises, by weight, based on the weight of the metal-powder core:
   from about 30% to about 50% by weight chromium;
   from about 1% to about 3% by weight nickel;
   from about 0.3% to about 1% by weight nitrogen;
   from about 1% to about 8% by weight manganese;
   from about 5% to about 7% by weight carbon
   from about 0.25% to about 4% by weight silicon; and
   from about 47% to about 60% by weight iron.

10. The metal cored wire of claim 9, wherein the metal sheath comprises, by weight, based on the weight of the metal sheath:
   from about 16% to about 22% by weight chromium;
   from about 7% to about 12% by weight nickel;
   from about 0.01% to about 1% by weight manganese;
   from about 0.04% to about 0.12% by weight carbon
   from about 0.1% to about 1% by weight silicon; and
   from about 60% to about 75% by weight iron.

11. The metal cored wire of claim 9, wherein the weight of the metal-powder core ranges from about 20% to about 40% of the total weight of the metal cored wire.

12. The metal cored wire of claim 9, wherein the weight of the metal-powder core is about 40% of the total weight of the metal cored wire.

13. A method of using the metal cored wire of claim 5, wherein:
   the hardband alloy formed onto the surface has a relative magnetic permeability of less than about 1.01 according to the API Standard; and
   the hardband alloy formed onto the surface has a weight loss of less than 0.5 grams according to ASTM G65 Wear Testing.

14. A method of using the metal cored wire of claim 6, wherein the hardband alloy formed onto the surface has a relative magnetic permeability of less than about 1.01 according to the API Standard, and wherein the hardband alloy formed onto the surface has a weight loss of less than 0.5 grams according to ASTM G65 Wear Testing.

15. The metal cored wire of claim 6, wherein the weight of the metal sheath ranges from about 60% to about 80% of the total weight of the metal cored wire, and the weight of the metal-powder core ranges from about 20% to about 40% of the total weight of the metal cored wire.

16. The method of claim 7, wherein the weight of the metal sheath ranges from about 60% to about 80% of the total weight of the metal cored wire, and the weight of the metal-powder core ranges from about 20% to about 40% of the total weight of the metal cored wire.

* * * * *